US010750263B2

(12) United States Patent
Prommersberger et al.

(10) Patent No.: US 10,750,263 B2
(45) Date of Patent: *Aug. 18, 2020

(54) PORTABLE SPEAKER SYSTEM FOR PROVIDING AUDIO CHANNELS BASED ON LOCATION

(71) Applicant: Harman Becker Automotive Systems GmbH, Karlsbad (DE)

(72) Inventors: Armin Prommersberger, Karlsbad (DE); Matthias von Saint-George, Pfinztal (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 87 days.

This patent is subject to a terminal disclaimer.

(21) Appl. No.: 15/888,604

(22) Filed: Feb. 5, 2018

(65) Prior Publication Data

US 2018/0160207 A1 Jun. 7, 2018

Related U.S. Application Data

(63) Continuation of application No. 15/349,429, filed on Nov. 11, 2016, now Pat. No. 9,888,305.

(60) Provisional application No. 62/254,972, filed on Nov. 13, 2015.

(51) Int. Cl.

| | |
|---|---|
| ***H04R 5/02*** | (2006.01) |
| ***H04B 3/00*** | (2006.01) |
| ***H04R 1/02*** | (2006.01) |
| ***H04R 3/12*** | (2006.01) |
| ***H04S 7/00*** | (2006.01) |
| *H04S 3/00* | (2006.01) |

(52) U.S. Cl.

CPC ............... *H04R 1/026* (2013.01); *H04R 1/02* (2013.01); *H04R 3/12* (2013.01); *H04S 7/30* (2013.01); *H04R 2205/021* (2013.01); *H04R 2420/03* (2013.01); *H04R 2420/07* (2013.01); *H04R 2499/13* (2013.01); *H04S 3/008* (2013.01)

(58) Field of Classification Search

CPC .. H04S 3/00; H04R 5/02; H04R 1/026; H04R 3/14; H04R 2420/03; H04R 2499/13

USPC ................................ 381/10, 80, 81, 86, 307

See application file for complete search history.

(56) References Cited

U.S. PATENT DOCUMENTS

| | | | | |
|---|---|---|---|---|
| 5,384,856 | A * | 1/1995 | Kyouno ................ | H03G 5/165 381/1 |
| 8,175,279 | B2 | 5/2012 | Tiwari et al. | |
| 8,638,957 | B2 | 1/2014 | Sim et al. | |
| 9,888,305 | B2 * | 2/2018 | Prommersberger ... | H04R 1/026 |
| 2003/0012394 | A1 | 1/2003 | Lee | |
| 2003/0039366 | A1 | 2/2003 | Eid et al. | |

(Continued)

OTHER PUBLICATIONS

JBL by Harman, "Voyager Integrated Home Audio System and Portable Wireless Speaker," Harman International Industries, Inc. (2013).

*Primary Examiner* — Katherine A Faley

(74) *Attorney, Agent, or Firm* — Brooks Kushman P.C.

(57) ABSTRACT

A speaker system is provided with a docking station, a removable housing mounted to the docking station, and a transducer supported by the removable housing. The speaker system is also provided with a processor supported by the removable housing and programmed to separate an audio signal into channels and provide at least one channel to the transducer based a location of the removable housing relative to the docking station.

20 Claims, 8 Drawing Sheets

(56) References Cited

U.S. PATENT DOCUMENTS

| | | | | |
|---|---|---|---|---|
| 2008/0020672 | A1* | 1/2008 | Osborn ................ | A63H 33/006 446/227 |
| 2009/0071414 | A1 | 3/2009 | Caputo | |
| 2012/0190406 | A1 | 7/2012 | Chen | |
| 2013/0251178 | A1 | 9/2013 | Yoon | |
| 2014/0341404 | A1 | 11/2014 | Choisel et al. | |
| 2015/0002088 | A1 | 1/2015 | Dagostino | |
| 2017/0105069 | A1 | 4/2017 | Mezzomo et al. | |
| 2017/0127204 | A1 | 5/2017 | Fisher et al. | |

* cited by examiner

PORTABLE SPEAKER SYSTEM FOR PROVIDING AUDIO CHANNELS BASED ON LOCATION

CROSS-REFERENCE TO RELATED APPLICATIONS

This application is a continuation of U.S. application Ser. No. 15/349,429 filed on Nov. 11, 2016, now U.S. Pat. No. 9,888,305, issued Feb. 6, 2018, which, in turn, claims the benefit of U.S. provisional application Ser. No. 62/254,972 filed Nov. 13, 2015, the disclosures of which are hereby incorporated in their entirety by reference herein.

TECHNICAL FIELD

One or more embodiments relate to a speaker system that is operable as a vehicle audio system and also includes components that are operable independent of the vehicle as portable speakers.

BACKGROUND

Conventional vehicles include audio systems that are integrated with other vehicle systems. Such vehicle audio systems are difficult to update after the vehicle is assembled. Although some vehicle audio systems allow software updates, it is difficult to update the hardware without replacing the whole system. Thus, it is difficult to upgrade the audio system because new software features would have to be implemented for the old hardware. Since electronics become obsolete relatively fast, vehicle audio systems tend to become outdated relatively fast, as compared to the rest of the vehicle systems.

SUMMARY

In one embodiment, a speaker system is provided with a docking station and a removable housing that is mounted to the docking station. The speaker system also includes a receiver, a transducer and a processor, that are supported by the removable housing. The receiver receives an audio signal from a mobile media device. The processor communicates with the receiver and is programmed to determine a location of the removable housing relative to the docking station, separate the audio signal into channels and provide at least one channel to the transducer based on the location.

In another embodiment, a speaker system is provided with a docking station and a loudspeaker assembly. The loudspeaker assembly includes: a removable housing mounted to the docking station and a receiver that is supported by the removable housing to receive an audio signal from a mobile media device. The loudspeaker assembly also includes a transducer and a processor that are supported by the removable housing. The processor communicates with the receiver, and is programmed to determine a location of the removable housing relative to the docking station, separate the audio signal into channels and to provide at least one channel to the transducer based on a location of the removable housing relative to the docking station. The loudspeaker assembly is replaceable by a second loudspeaker assembly with a second processor.

In yet another embodiment, an audio system is provided with a mobile media device, a docking station and a loudspeaker assembly. The loudspeaker assembly includes: a removable housing that is mounted to the docking station, a receiver supported by the removable housing to receive an audio signal from a mobile media device, a transducer supported by the removable housing, and a processor supported by the removable housing. The processor communicates with the receiver and is configured to determine a location of the removable housing relative to the docking station, separate the audio signal into channels and to provide at least one channel of the audio signal to the transducer.

In one embodiment, a speaker system is provided with a docking station and a loudspeaker. The docking station includes a housing having a recess formed therein and a controller and at least one transducer that are supported by the housing. The loudspeaker includes a processor and at least one loudspeaker transducer, wherein the loudspeaker is adapted to be received within the recess. The processor is programmed to receive an audio signal from a media device and to provide a first component of the audio signal to the transducer and a second component of the audio signal to the loudspeaker transducer in response to the loudspeaker being located within the recess. The processor is further programmed to provide the second component of the audio signal to the loudspeaker transducer in response to the loudspeaker being located away from the recess.

In another embodiment a speaker system is provided with a docking station, a removable housing mounted to the docking station, and a transducer supported by the removable housing. The speaker system is also provided with a processor supported by the removable housing and programmed to separate an audio signal into channels and provide at least one channel to the transducer based a location of the removable housing relative to the docking station.

In yet another embodiment a speaker system is provided with a docking station and a loudspeaker assembly. The loudspeaker assembly is provided with a removable housing mounted to the docking station, a receiver supported by the removable housing to receive an audio signal from a mobile media device, a transducer supported by the removable housing, and a processor supported by the removable housing and in communication with the receiver. The processor is programmed to: determine a location of the removable housing relative to the docking station, separate the audio signal into channels, and provide at least one channel to the transducer based on the location of the removable housing relative to the docking station. The loudspeaker assembly is replaceable by a second removable loudspeaker assembly with a second processor.

In still yet another embodiment an audio system is provided with a mobile media device; a docking station; and a loudspeaker assembly. The loudspeaker assembly is provided with a removable housing mounted to the docking station, a receiver supported by the removable housing to receive an audio signal from the mobile media device, a transducer supported by the removable housing, and a processor supported by the removable housing and in communication with the receiver. The processor is configured to: determine a location of the removable housing relative to the docking station, separate the audio signal into channels, and provide at least one channel to the transducer based on the location.

As such, the speaker system includes a portable loudspeaker assembly that communicates with an audio source, e.g., a mobile media device in multiple audio system configurations, including: a vehicle audio system configuration and a portable audio system configuration. The loudspeaker assembly includes the majority of the electronics (e.g., digital signal processors, etc.), so as audio electronics technology changes over time, the user may upgrade their vehicle audio system by simply replacing the loudspeaker with a newer model. Further, the speaker system is modular and allows for speakers to be added/subtracted to the audio system. The processor is configured to recognize the current configuration and speakers and separate the audio signals into appropriate components or channels for the corresponding speakers.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
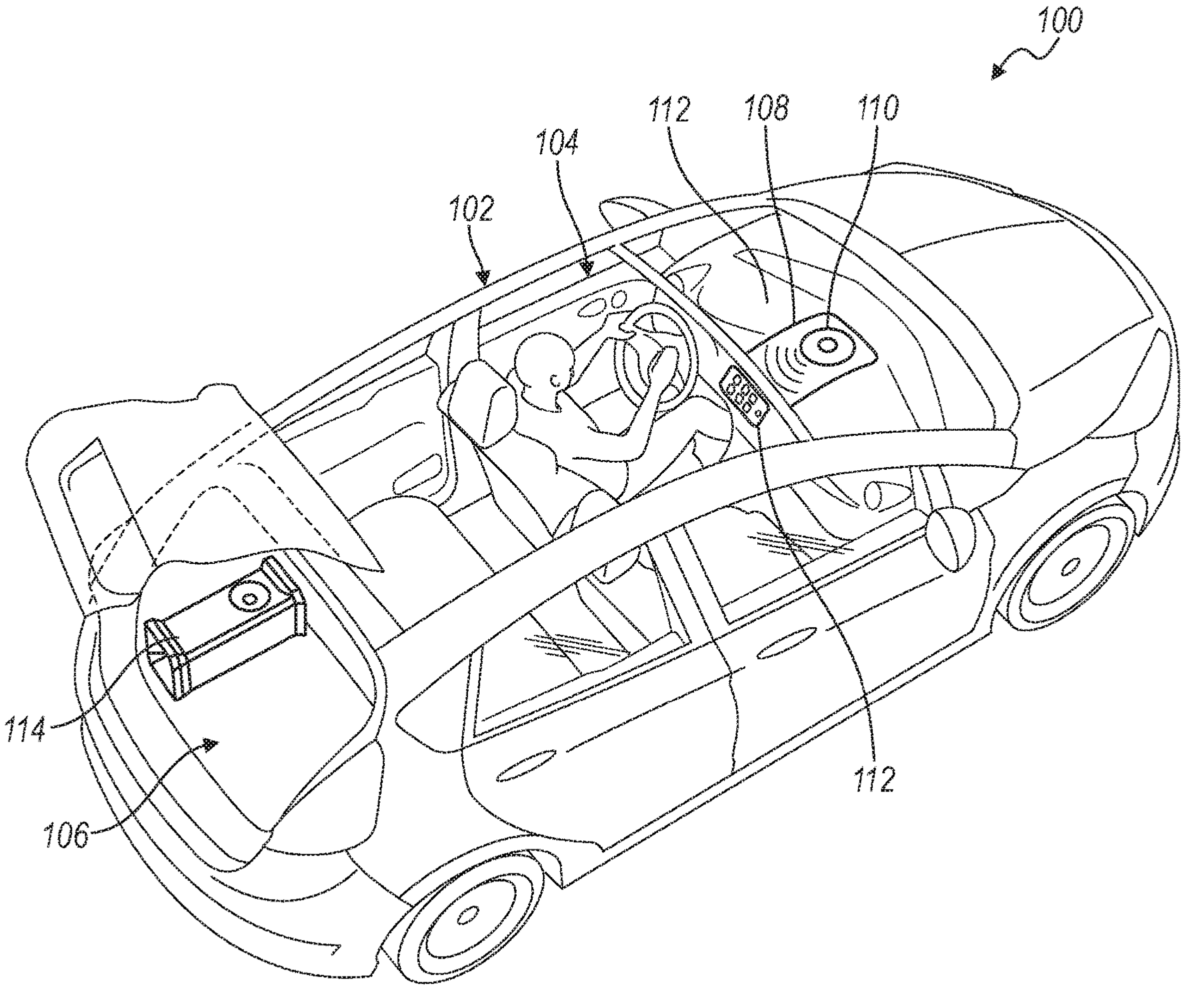
FIG. 1 is a top perspective view of a speaker system and a mobile media device in a vehicle according to one or more embodiments, illustrating a loudspeaker connected to a docking station within a passenger compartment and a subwoofer assembly mounted within a storage compartment.

With reference to FIG. 1, a speaker system is illustrated in accordance with one or more embodiments and generally referenced by numeral 100. The speaker system 100 is illustrated within a vehicle 102 that includes a passenger compartment 104 and a storage compartment 106. The speaker system 100 includes a docking station 108 and a loudspeaker assembly 110. The docking station 108 is rigidly mounted within a front central portion of the passenger compartment 104, according to the illustrated embodiment. The loudspeaker 110 connects to the docking station 108. The loudspeaker 110 may be disconnected from the docking station 108 and operated as a portable loudspeaker (shown in FIG. 5). The speaker system 100 communicates with a mobile media device 112 (e.g., a smart phone) for receiving media content (e.g., audio signals). The speaker system 100 and the mobile media device 112 collectively provide a vehicle audio system.

Audio system technology changes more rapidly than most users replace their vehicle. The speaker system 100 simplifies audio upgrades; which allows a user to upgrade their vehicle audio system multiple times during the life of the vehicle. The loudspeaker 110 includes the majority of the electronics (e.g., digital signal processors, etc.) of the speaker system 100. As audio electronics technology changes over time, the user may upgrade their vehicle audio system by simply replacing the loudspeaker 110 with a newer model loudspeaker. Additionally, most users upgrade their media device 112 (smart phone) annually, or bi-annually. Thus, by replacing the media device 112 and/or the loudspeaker 110, a user may easily upgrade their vehicle audio system with minimal time and expense, as compared to replacing a head-unit of a conventional audio system.

The speaker system 100 may also be upgraded by adding additional components. For example, a subwoofer assembly 114 may be added to the speaker system 100 to provide a full-range high-end vehicle audio system. The subwoofer assembly 114 can be mounted within the storage compartment 106 to communicate with the loudspeaker 110 and the docking station 108 to function as part of the vehicle audio system. The subwoofer assembly 114 may also be removed from the vehicle 102 to function as part of a portable audio system. The subwoofer assembly 114 includes a low-frequency transducer 116 (e.g., a subwoofer) and an integrated docking station for receiving the loudspeaker 110 to collectively provide a full-range speaker system when it is removed from the vehicle 102 (shown in FIGS. 7-8).

Figure 2:
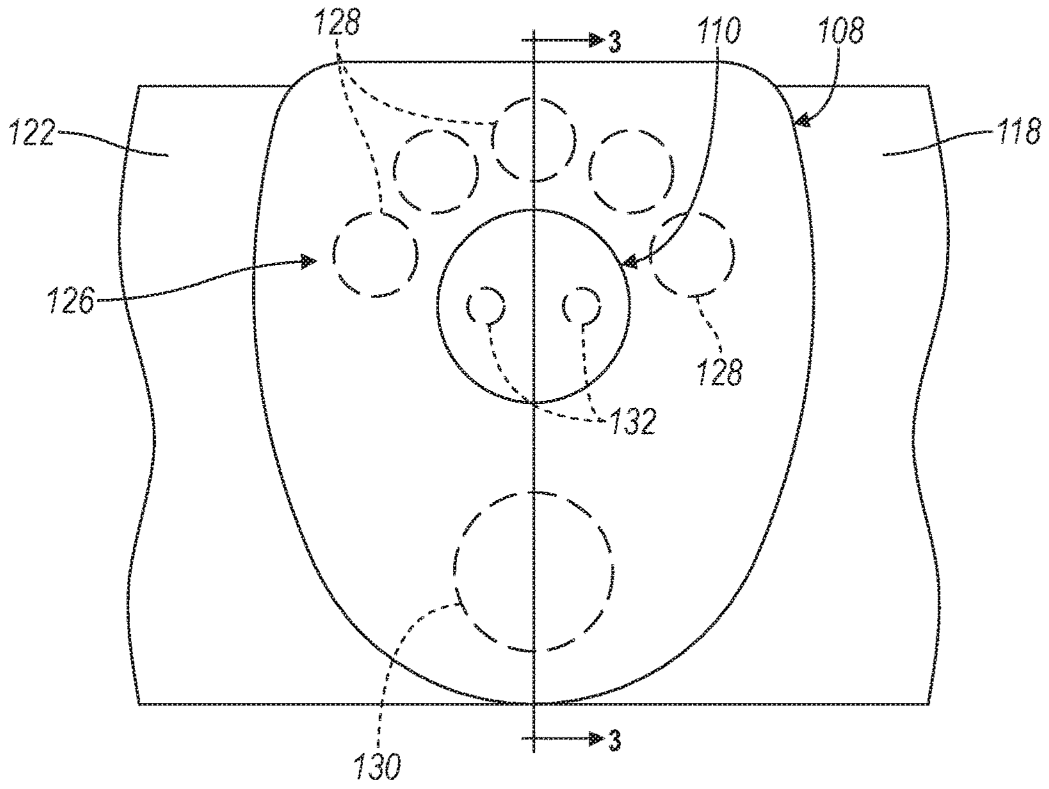
FIG. 2 is top perspective view of the loudspeaker and the docking station of FIG. 1.
Figure 3:
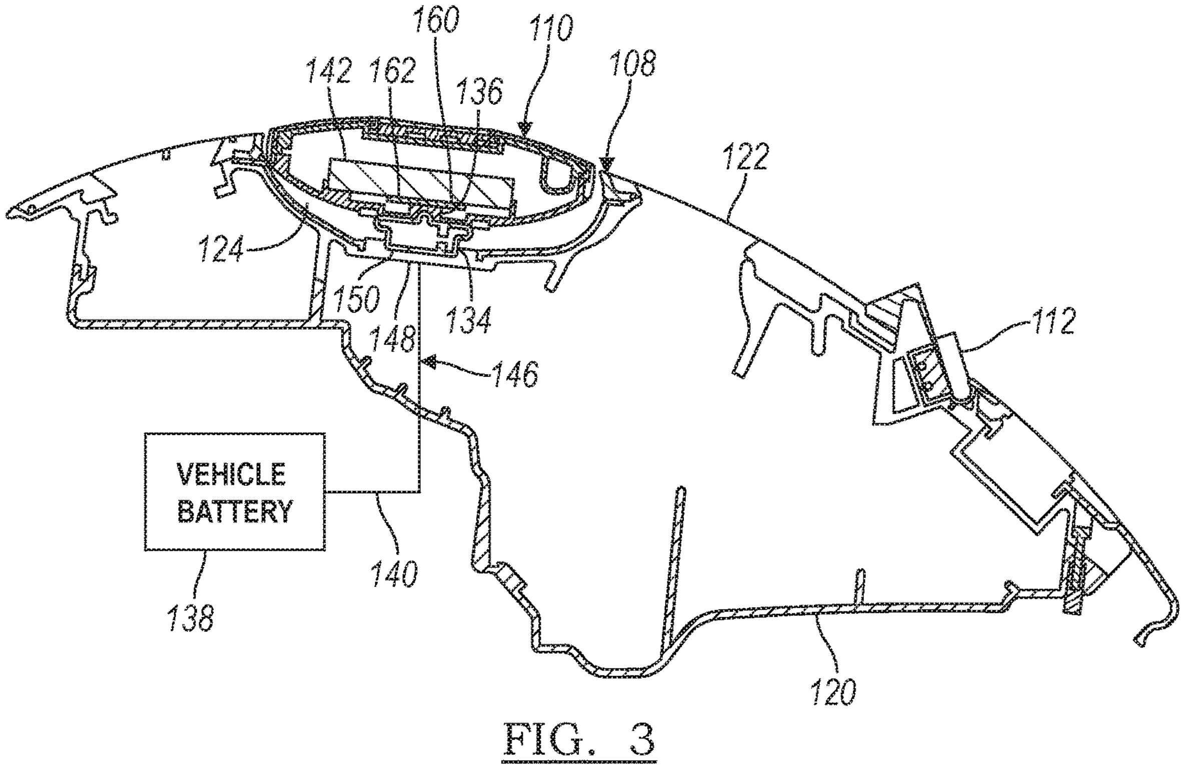
FIG. 3 is a cross-section view of the loudspeaker and the docking station of FIG. 2, taken along section line 3-3.

With reference to FIGS. 2 and 3, the docking station 108 is mounted to a central portion of a dashboard 118 of the vehicle 102, according to the illustrated embodiment. The docking station 108 includes a housing 120 with a grille 122 forming an outer surface. The docking station 108 includes a recess 124 that is formed into the grille 122 and defines a generally concave cavity for receiving the loudspeaker 110. The docking station 108 also includes an array 126 of transducers that are supported by the housing 120 and positioned about the recess 124 and underneath the grille 122. In the illustrated embodiment, the array 126 includes five mid-range transducers 128 and a low-range transducer 130 (i.e., a "woofer") that are angularly spaced apart from each other around the recess 124. The loudspeaker 110 includes at least two wide-band transducers 132.

The transducers of the speaker system 100 (i.e., the speaker array 126 and the mid-range transducers 128 of the loudspeaker 110) are designed to collectively provide sound throughout the passenger compartment 104.

The loudspeaker 110 can be charged when it is mounted or "docked" to the docking station 108. The docking station 108 includes an electrical connector 134 having terminals that contact corresponding terminals of a speaker connector 136 of the loudspeaker 110 for facilitating electrical communication. The electrical connector 134 is connected to a vehicle battery 138 by a vehicle harness 140; and the speaker connector 136 is connected to a speaker battery 142 by speaker wires to collectively form a charging circuit 146 for charging the speaker battery 142. The electrical connector 134 and the speaker connector 136 each include a magnet 148, 150 that are oriented proximate to each other to help retain the loudspeaker 110 to the docking station 108. In one embodiment the speaker connector 136 includes spring loaded contacts ("pogo-pins") and the electrical connector 134 includes contact plates. The magnets 148, 150 provide a magnetic force that biases the connectors 134, 136 toward each other. The spring loaded contacts are compressed by the corresponding contact plates ensuring the electrical connection.

Conventional vehicle audio systems (not shown) typically include a fixed head unit and fixed speakers distributed within the vehicle for providing audio throughout the passenger compartment. The speaker system 100 is mounted to a central portion of the dashboard 118 and provides audio throughout the passenger compartment 104. Thus, the speaker system 100 may replace an entire conventional vehicle audio system, resulting in fewer components, less mass, etc.

Figure 4:
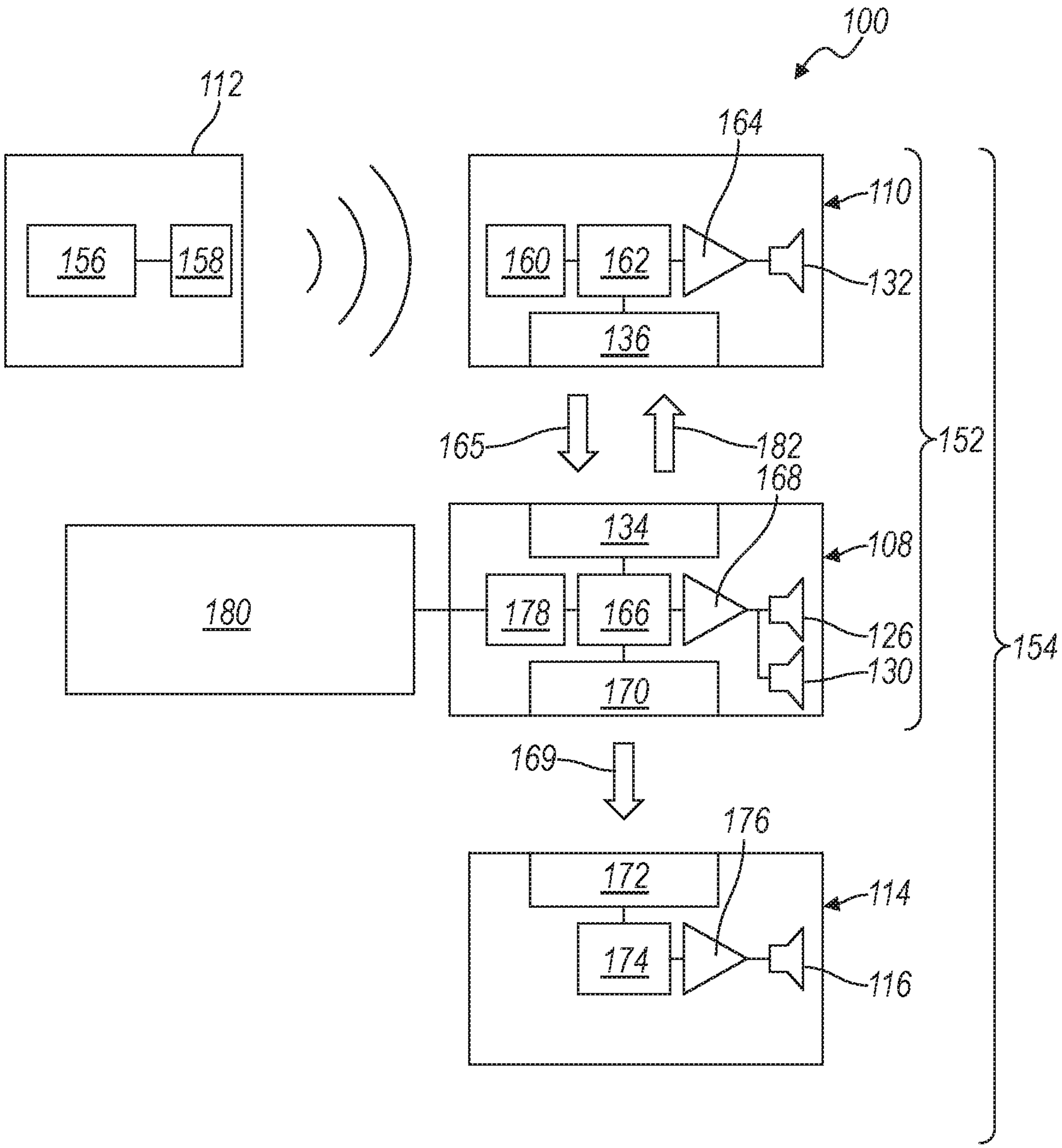
FIG. 4 is a system diagram of the speaker system and the mobile media device of FIG. 1, operating in a vehicle audio system configuration.

FIG. 4 is a system diagram illustrating electrical communication within a vehicle audio system including the speaker system 100 and the media device 112. The vehicle audio system may be configured as a base vehicle audio system 152, including the loudspeaker 110, docking station 108 and the media device 112. Additionally, the vehicle audio system may be upgraded to a high-end or premium vehicle audio system 154 by adding the subwoofer assembly 114.

The media device 112 provides media content to the loudspeaker 110. The media device includes a controller 156 and a transmitter 158. The controller 156 includes memory for storing media content, e.g., audio files. The controller 156 provides audio signals to the loudspeaker wirelessly using the transmitter 158. In other embodiments, the media device 112 may communicate with the loudspeaker 110 through wired communication and/or provide other media content, e.g., video signals. The media device 112 also includes one or more receivers (not shown) for receiving signals from an external source (e.g., AM, FM, satellite and HD signals), according to one or more embodiments.

The loudspeaker 110 processes the audio signals and distributes them to other components of the speaker system 100. The loudspeaker 110 includes at least one receiver 160 for receiving the audio signals from the media device 112. The loudspeaker 110 also includes a digital signal processor (DSP) 162 for processing the audio signals. The DSP 162 separates the audio signal into multiple components or channels by frequency (e.g., high, medium, low) and/or by location (e.g., left, right, front, rear) and provides the appropriate audio signal component to the corresponding transducer. The loudspeaker 110 includes one or more amplifiers 164 for amplifying the audio signals provided to the transducers 132. The transducers 132 convert the audio signals to sound. The loudspeaker 110 connects to the docking station 108 through the speaker connector 136 for distributing audio signals to the docking station 108 and the subwoofer assembly 114, as depicted by signal line 165.

The docking station 108 receives audio signals from the loudspeaker 110 through the electrical connector 134. The docking station 108 includes a controller 166 that distributes the audio signals to the appropriate transducers, i.e., the mid-range transducers 128 of the speaker array 126 and the woofer 130. The docking station 108 includes one or more amplifiers 168 for amplifying the audio signals provided to the transducers 128, 130, which in turn convert the audio signals to sound.

The docking station 108 and the subwoofer assembly 114 each include one or more interfaces for communicating with each other. In the illustrated embodiment, the docking station 108 and the subwoofer assembly 114 communicate by wired communication as depicted by signal line 169 between a docking station interface 170 and a subwoofer interface 172. In other embodiments, the docking station 108 and subwoofer assembly 114 include transceivers (not shown) for communicating wirelessly with each other.

The subwoofer assembly 114 includes a controller 174 that distributes the audio signals to the appropriate transducers, e.g., the subwoofer 116. The subwoofer assembly 114 includes one or more amplifiers 176 for amplifying the audio signals provided to the subwoofer 116, which in turn converts the audio signals to sound.

The loudspeaker 110 communicates with the docking station 108 for receiving vehicle level information. The controller 166 of the docking station 108 includes a transceiver 178 for communicating with other vehicle controllers (not shown) over a vehicle network 180 (e.g., Car Area Network (CAN), Local Interconnect Network (LIN), Media Oriented Systems Transport (MOST), FlexRay, and Ethernet including derivatives of each bus, for example, Audio Video Bridging (AVB) Ethernet). For example, in one embodiment the controller 166 receives volume control commands and vehicle speed information from other vehicle controllers over the vehicle network 180 and relays this information to the DSP 162 of the loudspeaker 110, as depicted by signal line 182. The DSP 162 adjusts the audio signals based on the volume controls and vehicle speed information. For example, in one embodiment the DSP 162 adjusts the audio signals to increase the volume of the corresponding sound, when vehicle speed increases above a threshold speed (e.g., 55 miles per hour) to compensate for external noise at high vehicle speeds.

Figure 5:
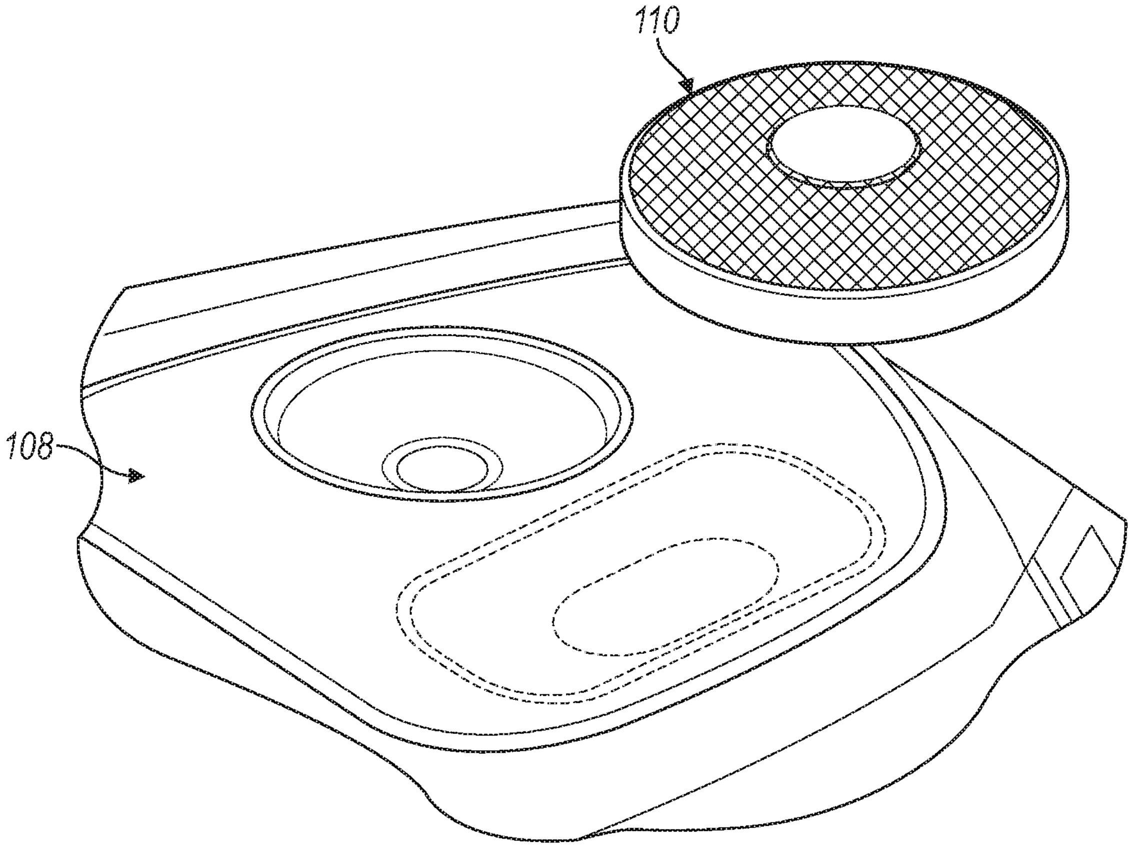
FIG. 5 is top perspective view of the loudspeaker of FIG. 1, illustrated disconnected from the docking station.
Figure 6:
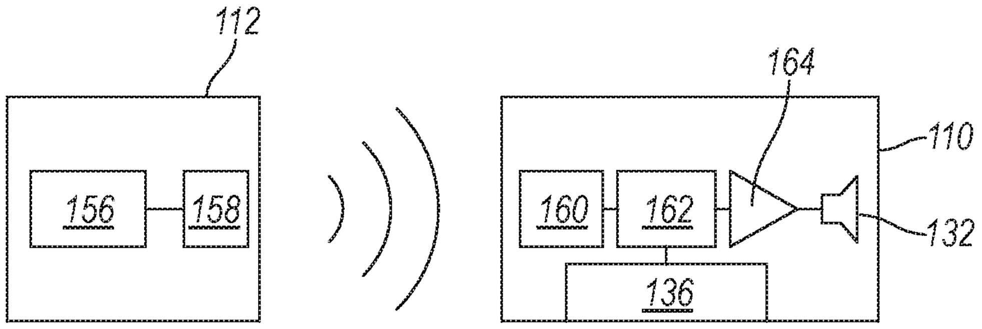
FIG. 6 is a system diagram of the mobile media device and the loudspeaker of FIG. 1, operating in a portable audio system configuration.

With reference to FIGS. 5 and 6, the loudspeaker 110 may be disconnected from the docking station 108 and operated as a portable loudspeaker 110. The media device 112 continues to provide media content to the loudspeaker 110 while it is being connected to, or disconnected from the docking station 108, so that the loudspeaker 110 continuously plays the corresponding audio from the wide-hand transducers 132. The DSP 162 receives information from the docking station controller 166 and the subwoofer assembly controller 174 through wired communication while the loudspeaker 110 is connected to the docking station 108. And the DSP 162 stops receiving such information when the loudspeaker 110 is disconnected from the docking station 108; which allows the DSP 162 to determine its configuration (e.g., as part of a vehicle audio system or as part of a portable audio system) and adjust the corresponding audio signals.

Figure 7:
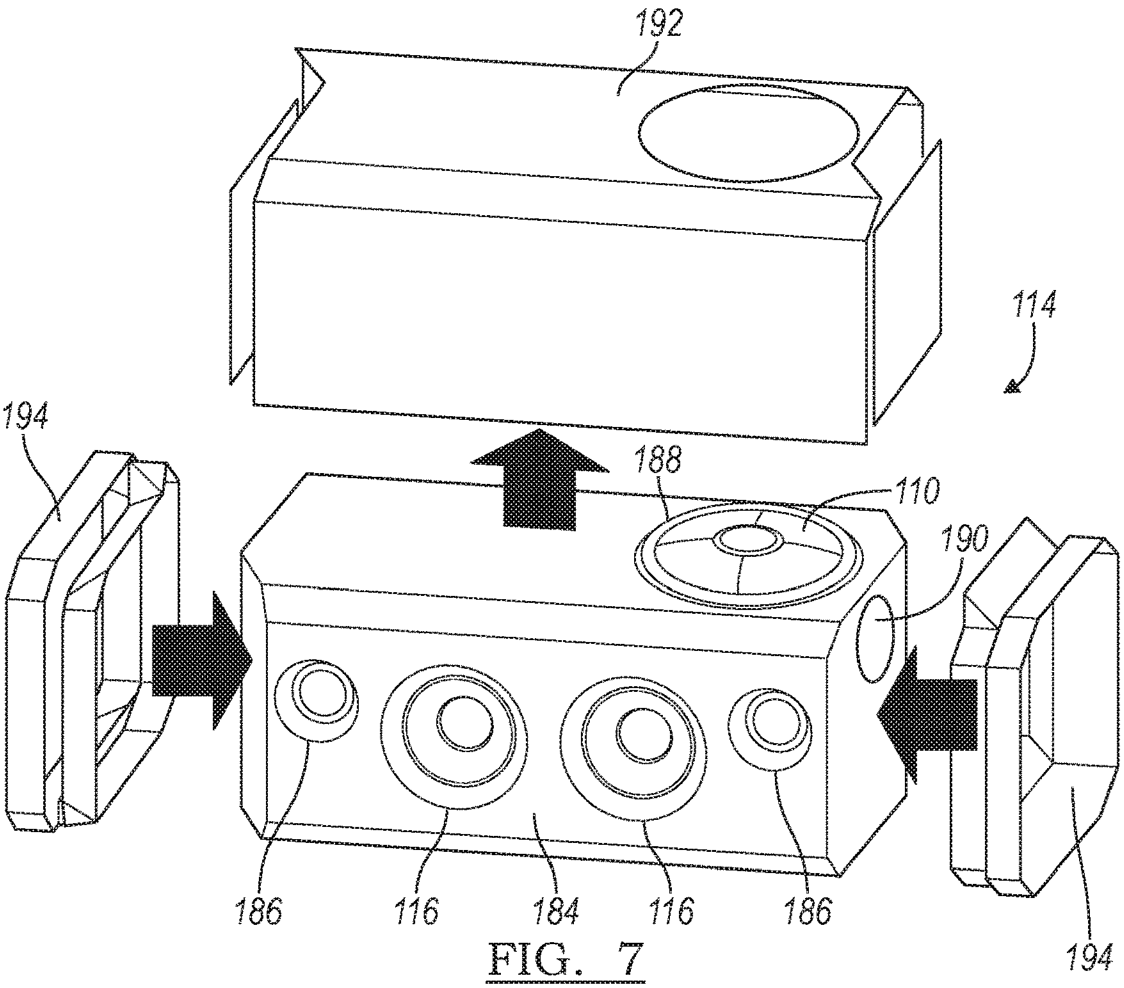
FIG. 7 is a front exploded view of the subwoofer assembly of FIG. 1.
Figure 8:
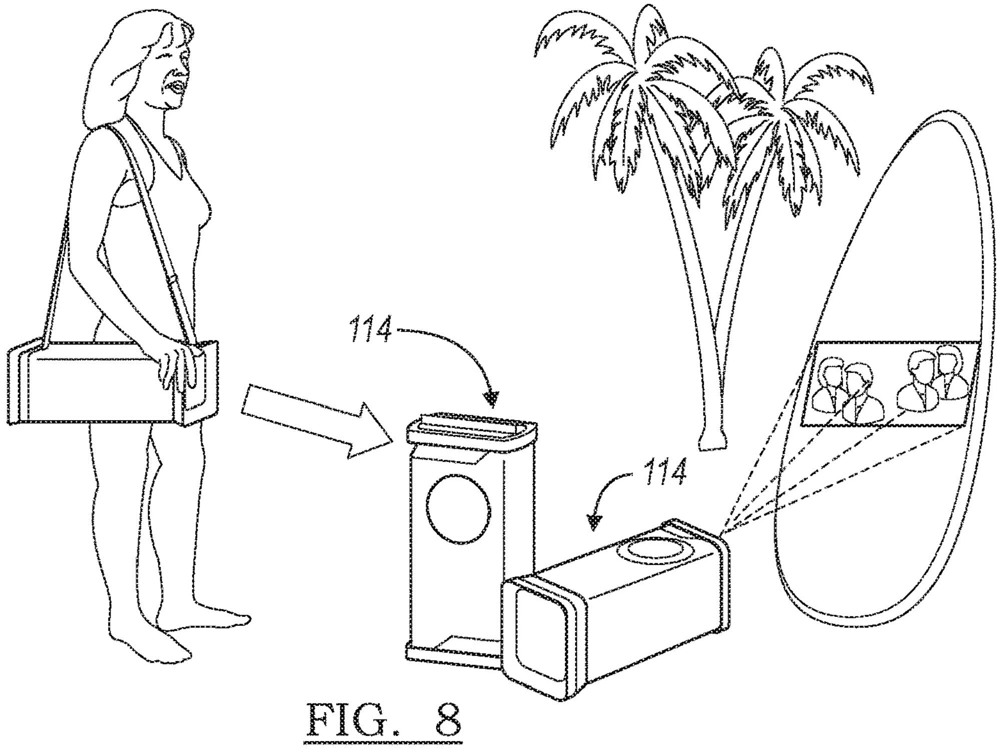
FIG. 8 are front perspective views of the subwoofer assembly of FIG. 1 remote from the vehicle, illustrated carried in a horizontal position, and illustrated resting on an underlying surface in an upright position and in a horizontal position.

With reference to FIG. 7, the subwoofer assembly 114 may be mounted within a storage compartment 106 of the vehicle 102 (shown in FIG. 1) or it may be removed from the vehicle 102 and function as part of a portable audio system. The subwoofer assembly 114 includes a housing 184 that supports at least four fixed transducers: two low-frequency transducers 116 (e.g., subwoofers) and two mid-range transducers 186. In one embodiment, the mid-range transducers 186 are disabled when the subwoofer assembly 114 is connected to the vehicle 102 as part of the vehicle audio system. The subwoofer assembly 114 also includes a receptacle 188 for receiving the loudspeaker 110. The subwoofer assembly 114 also includes a projector 190 for projecting media content (e.g., video, as shown in FIG. 8). The subwoofer assembly 114 includes a cover 192 that is disposed over the housing 184 for protecting the transducers; and a pair of end-caps 194 for securing the cover 192 to the housing 184. The subwoofer assembly 114 also includes a battery (not shown) that connects to a vehicle charging circuit for charging the battery when the subwoofer assembly 114 is mounted in the vehicle.

Referring to FIG. 8, the subwoofer assembly 114 may be carried in a horizontal position. The subwoofer assembly 114 may rest on an underlying surface in an upright position or in a horizontal position for playing audio and for projecting video against an upright surface, e.g., a surfboard, as shown in the illustrated embodiment.

Figure 9:
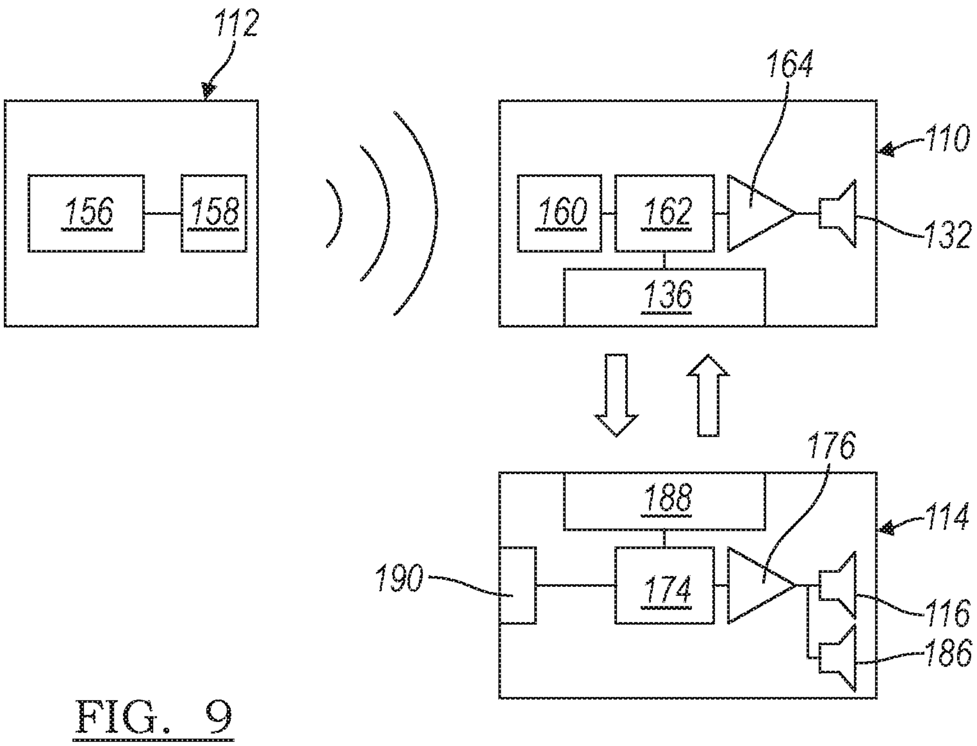
FIG. 9 is a system diagram of the mobile media device, the loudspeaker and the subwoofer assembly of FIG. 1, operating in a portable audio system configuration.

With reference to FIG. 9, the loudspeaker 110 may be disconnected from the docking station 108 (shown in FIG. 5) and connected to the subwoofer assembly 114 and communicate with the media device 112 to collectively provide a full-range portable audio system. The DSP 162 receives information from the docking station controller 166 and the subwoofer assembly controller 174 through wired communication while the loudspeaker 110 is connected to the docking station 108 (as shown in FIGS. 1-4). And the DSP 162 receives information from the subwoofer assembly controller 174 through wired communication while the loudspeaker 110 is connected to the receptacle 188 of the subwoofer assembly 114; which allows the DSP 162 to determine its configuration (e.g., as part of a vehicle audio system or as part of a portable audio system) and adjust the corresponding audio signals.

It is recognized that any controller, circuit or other electrical device disclosed herein may include any number of microprocessors, integrated circuits, memory devices (e.g., FLASH, RAM, ROM, EPROM, EEPROM, or other suitable variants thereof) and software which co-act with one another to perform any number of the operation(s) as disclosed herein. In addition, any one or more of the controllers may be configured to execute a computer-program that is embodied in a non-transitory computer readable medium that is programmed to perform any number of the functions as disclosed.

Figure 10:
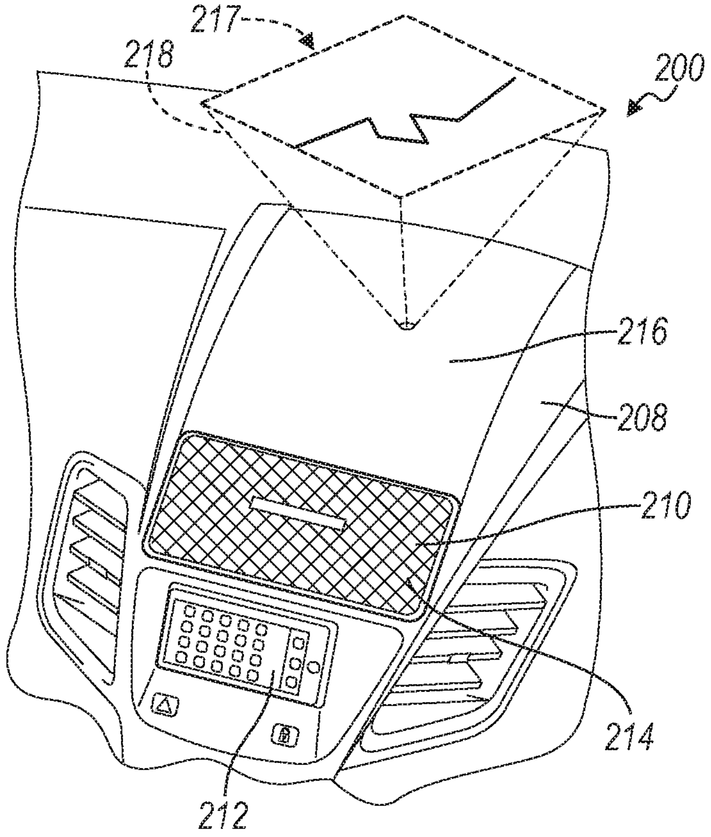
FIG. 10 is a top perspective view of a speaker system according to another embodiment, illustrating a loudspeaker connected to a docking station within a passenger compartment of the vehicle and the mobile media device.
Figure 11:
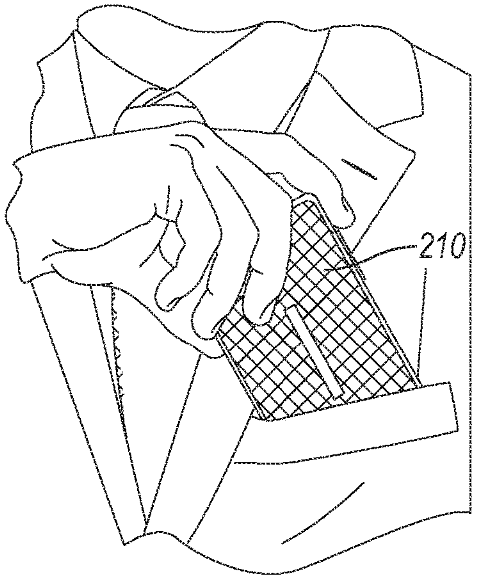
FIG. 11 is a front perspective view of the loudspeaker of FIG. 10, illustrated disconnected from the docking station, and stowed within a pocket.

FIGS. 10-16 illustrate alternate embodiments of the speaker system. FIGS. 10-11 illustrate a speaker system 200 that includes a docking station 208 and a loudspeaker 210 that communicates with a mobile media device 212. The loudspeaker 210 has a rectangular shaped front facie 214, and the docking station 208 includes a projector 216 for projecting an image 217 above a dashboard 218 of the vehicle. As shown in the illustrated embodiment, the projected image 217 may depict a map as part of a navigation display. The loudspeaker 210 and the docking station 208 each include a plurality of transducers (not shown) and collectively provide a vehicle audio system, similar to the loudspeaker 110 and docking station 108 of FIGS. 1-9. Additionally, the loudspeaker 210, may be disconnected from the docking station 208, and operate as a portable loudspeaker 210 that is sized to fit in a user's pocket, as shown in FIG. 11.

Figure 12:
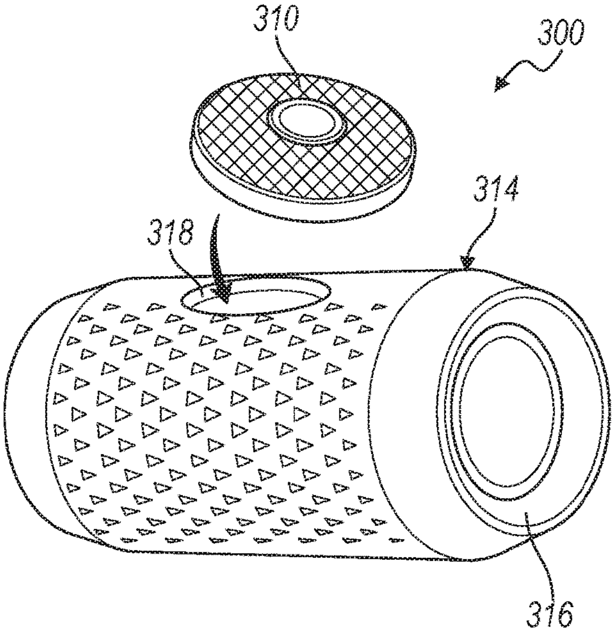
FIG. 12 is a front perspective view of a speaker system according to another embodiment, illustrating a loudspeaker disconnected from a subwoofer assembly.
Figure 13:
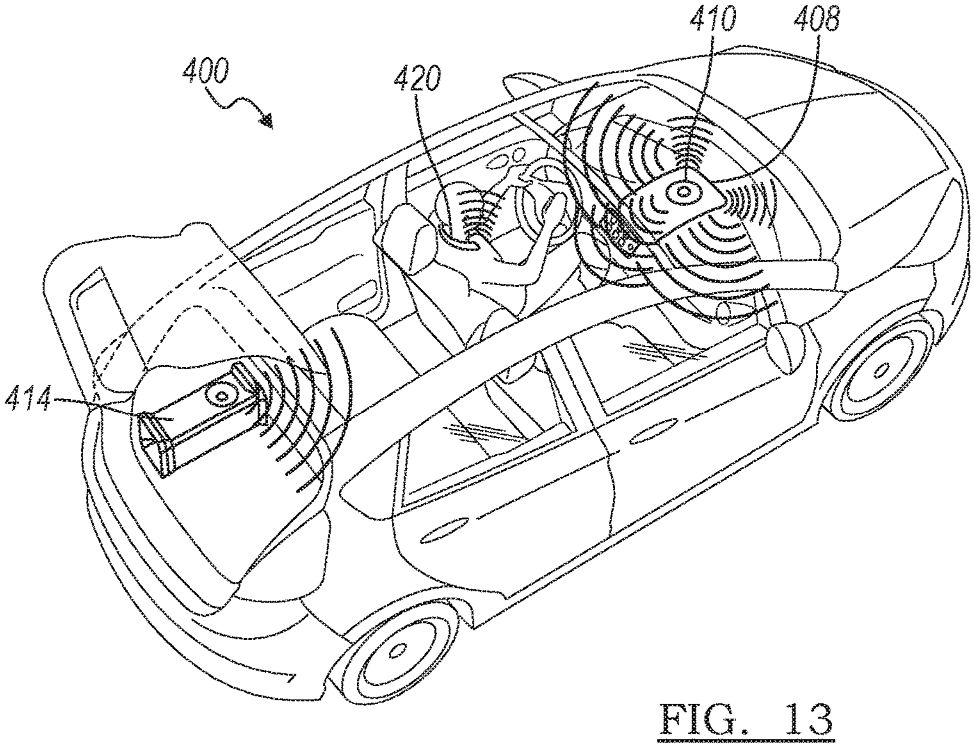
FIG. 13 is a top perspective view of a speaker system in a vehicle according to one or more embodiments, illustrating a loudspeaker connected to a docking station and a portable speaker coupled to a driver within a passenger compartment and a portable subwoofer mounted within a storage compartment of a vehicle.
Figure 14:
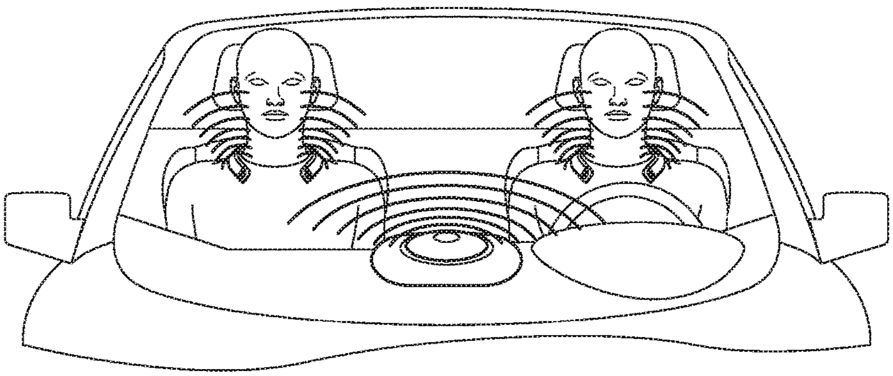
FIG. 14 is a rear view of the speaker system of FIG. 13, illustrating the portable speaker coupled to the driver and a second portable speaker coupled to a passenger.
Figure 15:
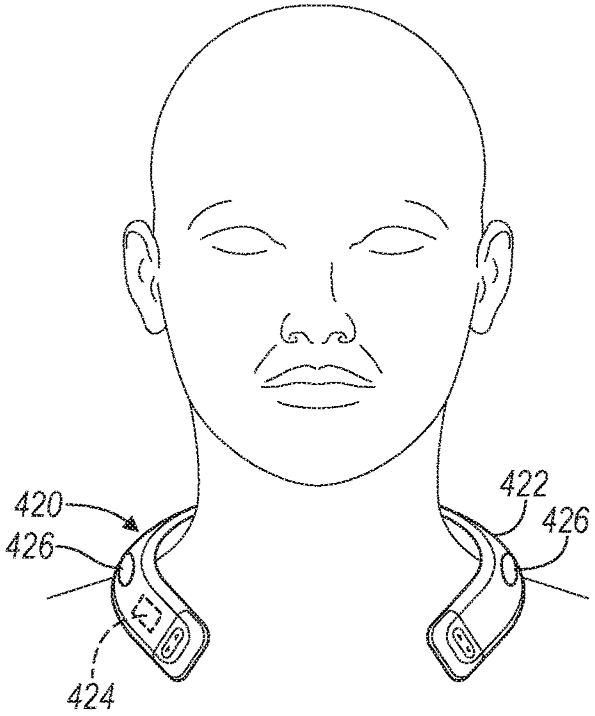
FIG. 15 is a front view of the portable speaker of FIG. 13, illustrated coupled to the driver.
Figure 16:
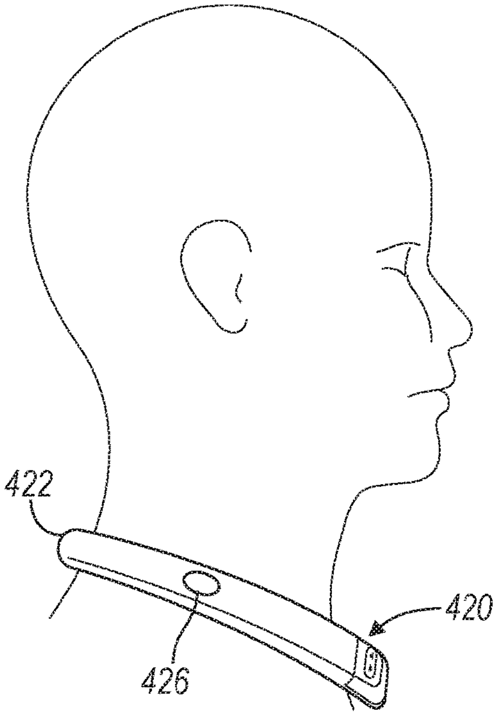
FIG. 16 is a side view of the portable speaker of FIG. 13.

FIG. 12 illustrates a speaker system 300 that includes a loudspeaker 310 and a subwoofer assembly 314. The subwoofer assembly 314 includes a housing 316 having a generally cylindrical shape and a receptacle 318 for receiving the loudspeaker 310. The loudspeaker 310 and the subwoofer assembly 314 each include a plurality of transducers (not shown) and collectively provide a full-range portable speaker system, similar to the portable speaker system of FIGS. 7-9.

FIGS. 13-16 illustrate a speaker system 400 that communicates with a mobile media device 412 to provide a vehicle audio system. The speaker system 400 includes a docking station 408, a loudspeaker 410 and a subwoofer assembly 414 that each include a plurality of transducers, similar to the speaker system 100 of FIGS. 1-9. The speaker system 400 also includes one or more portable speakers 420 that attach to a user. Each portable speaker 420 includes a band 422 that wraps around a user's neck and rests upon their shoulders, i.e. "neckphones" or "neckband" headphones. The portable speaker 420 also includes a controller 424 and a plurality of micro-transducers 426 that are distributed along the length of the band 422. The controller 424 communicates wirelessly with the docking station 408 for receiving audio signals. The portable speaker(s) 420 enhance the vehicle audio system 400 by providing localized surround sound about a user.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A speaker system comprising:

a docking station to mount within a vehicle;

a removable housing mounted to the docking station;

a transducer supported by the removable housing; and a processor supported by the removable housing and programmed to determine a location of the removable housing relative to the docking station, separate an audio signal into channels, and provide at least one channel to the transducer based on the based a location of the removable housing relative to the docking station.

2. The speaker system of claim 1 further comprising:

a second removable housing to be mounted to the docking station for replacing the removable housing;

a second transducer supported by the second removable housing; and a second processor supported by the removable housing.

3. The speaker system of claim 1, wherein the processor is further programmed to:

provide a first channel of the audio signal to the transducer in response to the removable housing being located proximate to the docking station; and provide a second channel of the audio signal to the transducer in response to the removable housing being located remote from the docking station.

4. The speaker system of claim 3 wherein at least one of the first channel and the second channel correspond to a transducer location.

5. The speaker system of claim 3 wherein at least one of the first channel and the second channel correspond to a transducer frequency.

6. The speaker system of claim 3 wherein the processor is further programmed to transition from providing the first channel of the audio signal to the transducer to providing the second channel of the audio signal to the transducer in response to the removable housing being disconnected from the docking station such that the transducer continuously generates corresponding audio during the transition.

7. The speaker system of claim 1 further comprising:

a receiver in communication with the processor and adapted to communicate with an external controller through wired communication when the removable housing is mounted to the docking station;

wherein the processor is further programmed to determine the location of the removable housing relative to the docking station based on receipt of information from the external controller.

8. The speaker system of claim 1 wherein the processor is further programmed to:

receive information indicative of at least one of a speaker configuration and vehicle speed; and adjust a volume of audio generated by the transducer based on the information.

9. The speaker system of claim 1 further comprising a projector supported by the removable housing.

10. The speaker system of claim 1 further comprising:

a portable speaker housing for coupling to a user's neck; and a micro-transducer supported by the portable speaker housing;

wherein the processor is further programmed to provide a third channel of the audio signal to the micro-transducer.

11. The speaker system of claim 1 further comprising a magnet supported by the removable housing and oriented to engage a corresponding magnet supported by the docking station for retaining the removable housing to the docking station.

12. The speaker system of claim 1 further comprising:

a battery supported by the removable housing; and a connector externally mounted to the removable housing and in electrical communication with the battery;

wherein the connector is adapted to connect to an external source for charging the battery when the removable housing is mounted to the docking station.

13. An audio system comprising:

a speaker system according to claim 1; and a mobile media device to provide the audio signal to the speaker system;

wherein the audio system is adapted to provide a vehicle audio system without a fixed head-unit.

14. The audio system of claim 13 wherein the removable housing is further defined as a first loudspeaker assembly; and a second removable loudspeaker assembly, to be mounted to the docking station, the second removable loudspeaker assembly comprising:

a second processor with electronics that are different from the processor of the first loudspeaker assembly.

15. A speaker system comprising:

a docking station to mount within a vehicle; and a loudspeaker assembly comprising:

a removable housing mounted to the docking station, a receiver supported by the removable housing to receive an audio signal from a mobile media device, a transducer supported by the removable housing, and a processor supported by the removable housing and in communication with the receiver, wherein the processor is programmed to:

determine a location of the removable housing relative to the docking station, separate the audio signal into channels, and provide at least one channel to the transducer based on the location of the removable housing relative to the docking station;

wherein the loudspeaker assembly is replaceable by a second removable loudspeaker assembly with a second processor.

16. The speaker system of claim 15, wherein the processor is further programmed to:

provide a first channel of the audio signal to the transducer in response to the removable housing being located proximate to the docking station; and provide a second channel of the audio signal to the transducer in response to the removable housing being located remote from the docking station.

17. The speaker system of claim 15 further comprising:

a portable speaker housing for coupling to a user's neck; and a micro-transducer supported by the portable speaker housing;

wherein the processor is further programmed to provide a fifth channel of the audio signal to the micro-transducer.

18. An audio system comprising:

a mobile media device;

a docking station to mount within a vehicle; and a loudspeaker assembly comprising:

a removable housing mounted to the docking station, a receiver supported by the removable housing to receive an audio signal from the mobile media device, a transducer supported by the removable housing, and a processor supported by the removable housing and in communication with the receiver, wherein the processor is configured to:

determine a location of the removable housing relative to the docking station, separate the audio signal into channels, and provide at least one channel to the transducer based on the location.

19. The audio system of claim 18, wherein the processor is further configured to:

provide a first channel of the audio signal to the transducer in response to the removable housing being located proximate to the docking station; and provide a second channel of the audio signal to the transducer in response to the removable housing being located remote from the docking station.

20. The audio system of claim 18 further comprising:

a portable speaker housing for coupling to a user's neck; and a micro-transducer supported by the portable speaker housing;

wherein the processor is further configured to provide a fifth channel of the audio signal to the micro-transducer.

* * * * *